(12) United States Patent
Nagasawa et al.

(10) Patent No.: US 11,358,104 B2
(45) Date of Patent: Jun. 14, 2022

(54) BEVERAGE SUPPLY APPARATUS

(71) Applicant: SANDEN RETAIL SYSTEMS CORPORATION, Isesaki (JP)

(72) Inventors: Takashi Nagasawa, Isesaki (JP); Yuji Ebihara, Isesaki (JP); Yoshihito Osawa, Isesaki (JP); Takahiro Toriumi, Isesaki (JP)

(73) Assignee: SANDEN RETAIL SYSTEMS CORPORATION, Gunma (JP)

( * ) Notice: Subject to any disclaimer, the term of this patent is extended or adjusted under 35 U.S.C. 154(b) by 436 days.

(21) Appl. No.: 16/614,735

(22) PCT Filed: Apr. 23, 2018

(86) PCT No.: PCT/JP2018/017361
§ 371 (c)(1),
(2) Date: Nov. 18, 2019

(87) PCT Pub. No.: WO2018/211960
PCT Pub. Date: Nov. 22, 2018

(65) Prior Publication Data
US 2020/0179881 A1  Jun. 11, 2020

(30) Foreign Application Priority Data
May 19, 2017 (JP) .............................. JP2017-100280

(51) Int. Cl.
*B01F 3/04* (2006.01)
*B01F 23/232* (2022.01)
(Continued)

(52) U.S. Cl.
CPC ............. *B01F 23/232* (2022.01); *A47J 31/40* (2013.01); *A47J 31/4485* (2013.01);
(Continued)

(58) Field of Classification Search
CPC ...... A47J 31/461; A47J 31/462; A47J 31/468; A47J 31/5253; A47J 31/60; A47J 31/52;
(Continued)

(56) References Cited

U.S. PATENT DOCUMENTS 9,480,867 B2  11/2016  Pace et al.
2012/0305597 A1  12/2012  Larzul
(Continued)

FOREIGN PATENT DOCUMENTS

CN  102245067  11/2011
CN  102753065  10/2012
(Continued)

OTHER PUBLICATIONS

Office Action dated Sep. 23, 2020 issued in Germnan Patent Application No. 112018002569.1.
(Continued)

*Primary Examiner* — Vishal Pancholi
*Assistant Examiner* — Robert K Nichols, II
(74) *Attorney, Agent, or Firm* — Cozen O'Connor

(57) ABSTRACT

A beverage supply apparatus 100 includes milk tank 3, milk flow path L3, pump 7 for delivering a beverage, air flow path L6, pump 9 for supplying air configured to be capable of changing the discharge flow rate, release path L7 for discharging air flowing through air flow path L6 to the outside, on-off valve V7, first throttle part 16, and second throttle part 17. One end of release path L7 is connected to release point Z8 in air flow path L6, and the other end is open to the outside. On-off valve V7 is disposed in a flow path extending between release point Z8 and pump 9 in air flow path L6, and opens and closes this flow path. Throttle part 16 is disposed in a flow path extending downstream of release point Z8 in air flow path L6, and throttle part 17 is disposed in release path L7.

7 Claims, 10 Drawing Sheets

(51) Int. Cl.
    *A47J 31/46*       (2006.01)
    *A47J 31/40*       (2006.01)
    *A47J 31/44*       (2006.01)
    *B67D 1/00*        (2006.01)
    *B67D 1/14*        (2006.01)
    *B01F 23/235*     (2022.01)
    *A23C 9/152*      (2006.01)

(52) U.S. Cl.
    CPC .......... *A47J 31/469* (2018.08); *B01F 23/235* (2022.01); *B67D 1/0043* (2013.01); *B67D 1/14* (2013.01); *A23C 9/1524* (2013.01); *B67D 2001/0093* (2013.01); *B67D 2210/00047* (2013.01)

(58) Field of Classification Search
    CPC ...... A47J 31/469; A47J 31/40; A47J 31/4485; B05B 11/0081; B01F 23/232; B01F 23/235; B67D 1/0043; B67D 1/14; B67D 2001/0093; B67D 2210/00047; A23C 9/1524
    USPC ............... 222/145.1, 145.5; 99/275, 300
    See application file for complete search history.

(56) References Cited

U.S. PATENT DOCUMENTS

| | | | |
|---|---|---|---|
| 2014/0197554 | A1 | 7/2014 | Bonsch |
| 2015/0313401 | A1 | 11/2015 | Chichilnisky |
| 2018/0303280 | A1* | 10/2018 | Locher ................ A47J 31/4485 |

FOREIGN PATENT DOCUMENTS

| | | |
|---|---|---|
| CN | 103327857 | 9/2013 |
| CN | 104853655 | 8/2015 |
| CN | 104869876 | 8/2015 |
| CN | 110475494 | 11/2019 |
| DE | 10033033 C1 | 6/2002 |
| DE | 102011102734 | 11/2012 |
| EP | 2478804 | 7/2012 |
| JP | 2013-518645 | 5/2013 |
| JP | 2014-516679 | 7/2014 |
| JP | 2014-208316 | 11/2014 |
| WO | WO 2010/014201 A2 | 2/2010 |

OTHER PUBLICATIONS

Office Action dated Dec. 31, 2020 issued in Chinese Application No. 201880032894.9.

\* cited by examiner

BEVERAGE SUPPLY APPARATUS

RELATED APPLICATIONS

This is a U.S. National Phase Application under 35 USC 371 of International Application PCT/JP2018/017361 filed on Apr. 23, 2018.

This application claims the priority of Japanese application no. 2017-100280 filed May 19, 2017, the entire content of which is hereby incorporated by reference.

TECHNICAL FIELD

The present invention relates to beverage supply apparatuses for supplying mixed beverages of liquid beverages and air.

BACKGROUND ART

Patent Document 1 discloses a coffeemaker equipped with a milk container for storing milk, a pump provided in the middle of piping between the milk container and a beverage outlet and drawing in and delivering milk in the milk container, and an air amount regulator provided in an air supply pipe connected to piping between the milk container and the pump and capable of adjusting the flow rate of air flowing through this air supply pipe. In this coffeemaker, a predetermined amount of air supplied through the air supply pipe and the air amount regulator is mixed with the milk in the piping between the milk container and the pump, and the pump is driven, whereby the coffeemaker produces foamy milk froth (also referred to as foamed milk; hereinafter, referred to as "foamed milk") as a mixed beverage of milk and air, and supplies this mixed beverage to a cup through the outlet.

In this connection, the tastes of customers for beverages such as coffee has become progressively diverse. Under these circumstances, there is demand for adjustment in accordance with the diversification in tastes also regarding the mixed beverage supplied by this kind of beverage supply apparatus. In this regard, the coffeemaker disclosed in Patent Document 1 can adjust the mixing ratio of milk and air in the mixed beverage, in other words, the ratio of the air in the mixed beverage, by adjusting the amount of air mixed with the milk by the air amount regulator, making it possible to mix a specified amount of air with the milk for frothing.

REFERENCE DOCUMENT LIST

Patent Document

Patent Document 1: JP 2014-208316 A

SUMMARY OF THE INVENTION

Problem to be Solved by the Invention

In the coffeemaker disclosed in Patent Document 1, the foamed milk obtained by mixing air with milk is poured on top a coffee beverage in a cup. For example, it is supplied as milk at the surface layer of a cappuccino or the like. It has low viscosity and does not have a high enough viscosity to be able to form a peak like in a meringue. In the following, a mixed beverage of milk and air, capable of forming a peak like in a meringue, is referred to as a "hard mixed beverage with relatively high viscosity" (in other words, a hard foam), and the abovementioned foamed milk is referred to as a "soft (loose) mixed beverage with relatively low viscosity" (in other words, a soft foam).

Here, to satisfy the increased diversity in tastes for beverages in recent years, the present inventors conducted an experiment in which milk and air are mixed to produce a hard mixed beverage (hard foam) with higher viscosity than the abovementioned foamed milk. As a result, the present inventors have experimentally confirmed that the greater the amount of air mixed with milk, the higher the viscosity of the mixed beverage is, and that it is necessary to accurately set the amount of air to be mixed with milk to produce a mixed beverage of a predetermined viscosity.

Then, the present inventors have confirmed that when, for example, the discharge pressure and discharge flow rate performance of an air supply pump for supplying air to be mixed with milk is excessive, even if the amount of air is adjusted by providing an air amount regulator in the air supply pipe, as in the case of the coffeemaker disclosed in Patent Document 1, it is difficult or impossible to produce a mixed beverage with predetermined viscosity with satisfactory reproducibility. Furthermore, a similar problem is involved not only in the apparatus for supplying the mixed beverage of milk and air but also in an apparatus for supplying an appropriate mixed beverage of some other liquid beverage and air.

Therefore, in view of the above circumstances, an object of the present invention is to provide a beverage supply apparatus capable of producing a mixed beverage with predetermined viscosity with satisfactory reproducibility.

Means for Solving the Problem

According to one aspect of the present invention, provided is a beverage supply apparatus comprising: a tank for storing a liquid beverage; a beverage flow path connecting the tank and a beverage delivery port; a beverage conveying pump disposed in the beverage flow path; an air flow path through which air to be supplied to the beverage flow path via a predetermined portion located between the tank and the beverage conveying pump in the beverage flow path flows; and an air supply pump disposed in the air flow path. The beverage supply apparatus drives the air supply pump to supply air to the beverage flow path and drives the beverage conveying pump, so as to deliver and supply a mixed beverage of the liquid beverage and the air from the beverage delivery port. The beverage supply apparatus further comprises a release path for discharging some of the air flowing through the air flow path to the outside, an air flow path on-off valve, a first throttle part, and a second throttle part. One end of the release path is connected to a release point, which is a predetermined portion located between a beverage flow path-side end and the air supply pump in the air flow path, and the other end is open to the outside. The air flow path on-off valve is disposed in a flow path extending between the release point and the air supply pump in the air flow path. The air flow path on-off valve opens and closes the flow path. The first throttle part is disposed in a flow path extending between the beverage flow path-side end and the release point in the air flow path, and the second throttle part is disposed in the release path. The air supply pump is configured to be capable of changing a discharge flow rate of air based on a predetermined input signal.

Effects of the Invention

In the beverage supply apparatus according to the aspect of the present invention, the air supply pump is configured to be capable of changing the discharge flow rate based on the predetermined input signal. Thus, when changing the viscosity of the mixed beverage, it is possible to adjust the viscosity of the mixed beverage by adjusting a parameter of the air supply pump, such as the pump revolution number, to adjust the discharge flow rate based on the predetermined input signal. In addition, the air flow path is provided with the air supply pump, the air flow path on-off valve, the release point, and the first throttle part, in this order, from the upstream of the air flow path. One end of the release path for discharging some of the air flowing through the air flow path to the outside is connected to the release point in the air flow path. The second throttle part is disposed in the release path.

In general, in the air supply pump capable of changing the discharge flow rate, the amount of change in the discharge flow rate with respect to the amount of change in the parameter, such as the pump revolution number, is substantially constant. Furthermore, there may be a case in which there is no option but to employ, as the air supply pump, a pump having a maximum discharge flow rate, which exceeds a range of flow rate necessary to produce the mixed beverage, that is, a pump having excessive performance, or a case in which such a pump is intentionally employed.

The present inventors conducted a preliminary experiment in which, in a case of using such an air supply pump having excessive performance, the flow rate of air to be supplied to the beverage flow path was adjusted by adjusting the pump revolution number of the air supply pump and then by supplying the entire amount of air to the beverage flow path through the air flow path, without providing a release path. As a result, the present inventors have confirmed that when using such an air supply pump having excessive performance, the sensitivity of the change in flow rate of air (air flow rate) supplied to the beverage flow path increases, because the sensitivity of the change in discharge flow rate with respect to the change of the pump revolution number is relatively high. The present inventors have also confirmed that it difficult or impossible to produce a mixed beverage with predetermined viscosity with satisfactory reproducibility with the air supply pump having excessive performance even if the discharge flow rate can be changed.

In this regard, the beverage supply apparatus according to the aspect of the present invention includes the release path. Thus, in the beverage supply apparatus according to the aspect of the present invention, during mixed beverage supply operation, the air flow path on-off valve is made to open and the air supply pump is driven at a predetermined discharge flow rate, so that some of the air discharged from the air supply pump is discharged to the outside through the release path and the second throttle part, and the remainder is supplied to the beverage flow path through the first throttle part. Thus, in the beverage supply apparatus according to the aspect of the present invention, it is possible to reduce the sensitivity of the change in the air flow rate with respect to the change in the pump revolution number by an amount corresponding to the air discharged to the outside, compared with the abovementioned case in which no release path is provided (i.e., the abovementioned preliminary experiment). Thus, even if the pump revolution number slightly deviates from the pump revolution number corresponding to the target air flow rate, the air flow rate is set to be near the target air flow rate. Furthermore, it is possible to accurately set the air flow rate to the target air flow rate by finely adjusting the pump revolution number. That is, the air flow rate of air supplied to the beverage flow path is generally determined based on the discharge flow rate of the air supply pump, the throttle channel cross-sectional area of the first throttle part, and the throttle channel cross-sectional area of the second throttle part. When changing the viscosity of the mixed beverage, it is possible to produce the mixed beverage with predetermined viscosity with satisfactory reproducibility merely by adjusting a parameter of the air supply pump, such as the pump revolution number, to adjust the discharge flow rate.

In this way, it is possible to provide a beverage supply apparatus capable of producing the mixed beverage with predetermined viscosity with satisfactory reproducibility.

MODE FOR CARRYING OUT THE INVENTION

Basic Arrangement of Beverage Supply Apparatus

Hereinbelow, embodiments of the present invention will be described with reference to the accompanying drawings.

Figure 1:
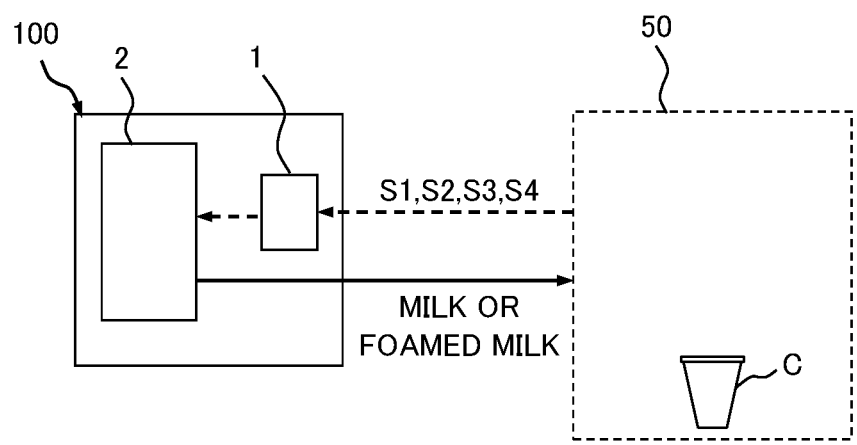
FIG. 1 is a block diagram illustrating a schematic configuration of a beverage supply apparatus according to a first embodiment of the present invention.
Figure 2:
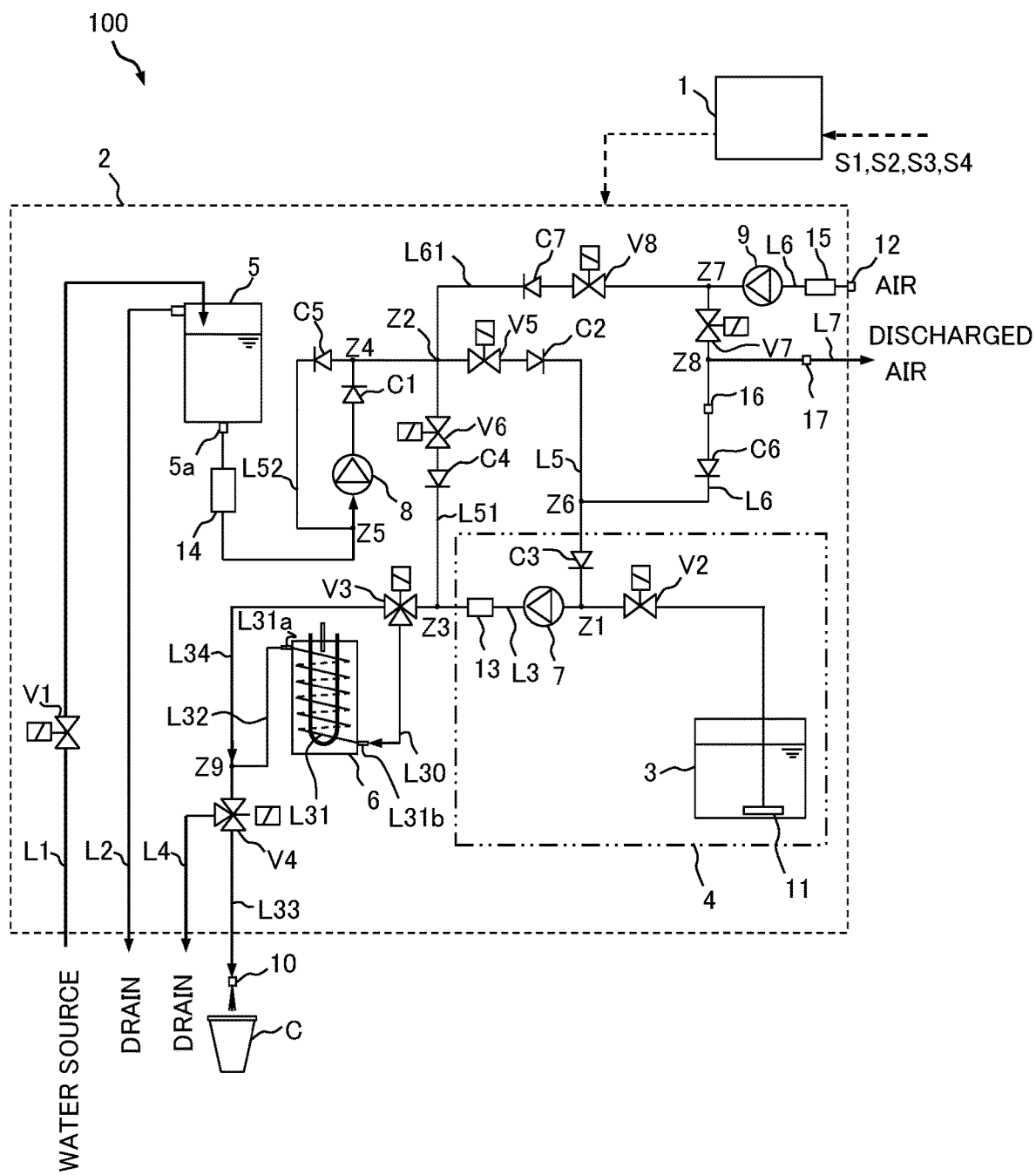
FIG. 2 is a flow line diagram of the beverage supply apparatus.

FIG. 1 is a block diagram for explaining the schematic configuration of a beverage supply apparatus 100 according to a first embodiment of the present invention, and FIG. 2 is a flow line diagram of the beverage supply apparatus 100.

Described below is an example of the beverage supply apparatus 100, which is provided adjacent to a coffee server 50 and is used as an optional apparatus of the coffee server 50, as illustrated in FIG. 1.

The coffee server 50, for example, brews coffee from coffee powder, and serves the brewed coffee in a cup C. The coffee server 50 is configured to be capable of serving preferred coffee by adding liquid milk (hereinafter, simply referred to as "milk"), as a liquid beverage, foamed milk (that is, a relatively low-viscosity mixed beverage of milk and air), or whipped milk (that is, a relatively high-viscosity mixed beverage of milk and air), to the brewed coffee, according to the request of customer, or the like.

It should be noted that there is no clear boundary between the foamed milk and the whipped milk. As used herein, the foamed milk and the whipped milk will be collectively called "mixed beverage" unless the subject requires distinguishing between the foamed milk and the whipped milk. The foamed milk may be appropriately termed, as a mixed beverage with relatively low viscosity, a soft mixed beverage, a loose mixed beverage, or a soft foam. The whipped milk may be appropriately termed, as a mixed beverage with relatively high viscosity, a hard mixed beverage, a mixed beverage capable of forming a peak, or a hard foam.

The beverage supply apparatus 100 is capable of supplying milk or the mixed beverage in a hot (warm) or cold state, and includes a control unit 1 and a main body unit 2. In the present embodiment, the beverage supply apparatus 100 is configured to supply milk or the mixed beverage to the cup C, which is provided in the coffee server 50.

The control unit 1 controls operation of the main body unit 2 as shown in FIG. 1. The control unit 1, for example, controls operation of each of the devices (a cooling storage 4, a heating device 6, pumps 7 to 9, and valves V1 to V8, described below) of the main body unit 2 to supply milk or the mixed beverage in a hot or cold state based on instructions from the coffee server 50. The beverage supply apparatus 100 controls operation of each device to: supply hot milk when a hot milk supply instruction S1 is input to the control unit 1; supply a hot mixed beverage when a hot mixed beverage supply instruction S2 is input to the control unit 1; supply cold milk when a cold milk supply instruction S3 is input to the control unit 1; and supply a cold mixed beverage when a cold mixed beverage supply instruction S4 is input to the control unit 1. When none of the supply instructions (S1 to S4) is input to the control unit 1, the beverage supply apparatus 100 enters standby mode.

In the present embodiment, the main body unit 2 includes a milk tank 3, the cooling storage 4, a water tank 5, the heating device 6, the first pump 7, the second pump 8, and the third pump 9, as shown in FIG. 2.

The milk tank 3 is a tank for storing milk as a liquid beverage. In the present embodiment, the milk tank 3 is accommodated in the cooling storage 4, and is configured to be capable of storing the milk at appropriate low temperature. In the present embodiment, the milk tank 3 corresponds to "tank" of the present invention.

The cooling storage 4 at least accommodates therein the milk tank 3, and is configured to be capable of maintaining the internal temperature at an appropriate set low temperature. In the present embodiment, in addition to the milk tank 3, devices, such as the first pump 7, are disposed in the cooling storage 4. For example, the internal temperature in the cooling storage 4 is controlled to be in a range less than 10° C., or more specifically, in a range of 2 to 3° C.

The water tank 5 is a tank for storing water. Water from a water source is supplied to the water tank 5 through a water supply path L1 configured to be opened and closed by a first electromagnetic on-off valve V1, for example. Overflow water from the water tank 5 is drained through an overflow path L2.

The heating device 6 is a device for heating milk or a mixed beverage. The heating device 6 is configured to heat a heating pipe L31 that constitutes a part of a milk flow path L3 connecting the milk tank 3 and a beverage delivery port 10. Specifically, in a state in which the beverage supply apparatus 100 is activated (main power ON), the heating device 6 always supplies electricity to an electric heater 6*b*, described below. In the present embodiment, the milk flow path L3 corresponds to "beverage flow path" of the present invention.

In the present embodiment, the milk flow path L3 connects a strainer 11, which is disposed in the milk tank 3, to the beverage delivery port 10. The milk flow path L3 is a flow path through which mainly milk and a mixed beverage flow. The milk flow path L3 includes, for example, an inflow pipe L30, the heating pipe L31, a delivery pipe L32, an outlet pipe L33, and a bypass pipe L34.

The inflow pipe L30 is disposed upstream of the heating device 6. One end of the inflow pipe L30 is connected to a first switching valve V3, described below, and the other end is connected to an inlet side end part L31*b*, described below, of the heating pipe L31. The heating pipe L31 is disposed in the heating device 6, as will be described below. The delivery pipe L32 is disposed downstream of the heating device 6. One end of the delivery pipe L32 is connected to an outlet side end part L31*a* of the heating pipe L31, and the other end is connected to a second switching valve V4, described below. The outlet pipe L33 connects an outlet-side end (corresponding to a portion to which the second switching valve V4, described below, is connected, in FIG. 2) of the delivery pipe L32 to the beverage delivery port 10. The bypass pipe L34 is disposed so as to bypass the heating pipe L31. A drain pipe L4 is connected to the outlet-side end of the delivery pipe L32. The milk flow path L3, except for the heating pipe L31, is made of a silicone hose or a fluorine hose, for example. On the other hand, the heating pipe L31 is made of a spirally wound stainless steel pipe, for example. The beverage delivery port 10 is, for example, a nozzle unit from which milk or a mixed beverage is delivered and is disposed above the cup C.

Figure 3:
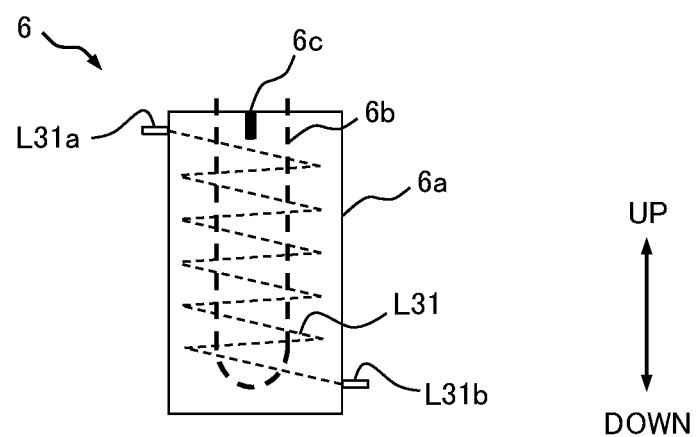
FIG. 3 is a side view of a heating device of the beverage supply apparatus.

FIG. 3 is a side view of the heating device 6. Specifically, the heating device 6 includes: a main body 6*a* made of a rectangular parallelepiped aluminum block casting; the U-shaped electric heater 6*b* cast in the main body 6*a*; and a temperature measurement sensor 6*c* inserted into a hole provided in the upper side portion of the main body 6*a*.

The heating pipe L31 and the electric heater 6*b* are cast in the main body 6*a*. The outlet side end part L31*a* of the heating pipe L31 projects outward from one side of the main body 6*a* at a predetermined vertically upper portion, and the inlet side end part L31*b* of the heating pipe L31 projects outward from a side opposite to the one side of the main body 6*a* at a predetermined vertically lower portion. The temperature in the main body 6*a* is measured by the temperature measurement sensor 6*c*, and is input to the control unit 1, for example. The control unit 1 controls input current, or the like, of the electric heater 6*b* based on the measured temperature from the temperature measurement sensor 6*c*, to control the temperature in the main body 6*a* to be maintained at a predetermined set heating temperature. When the main body 6*a* is heated by the electric heater 6*b*, the heating pipe L31 cast in the main body 6*a* is also heated. When cold milk or a cold mixed beverage is made to flow through the heating pipe L31 in a state in which the set heating temperature of the heating device 6 is set to approximately 75° C., hot milk or a hot mixed beverage, which has been heated to a temperature adequate for drinking, flows out from the outlet side end part L31*a*.

Principally, the first pump 7 is a pump for taking in and discharging milk from the milk tank 3, and is disposed at a predetermined portion in the milk flow path L3 closer to the milk tank 3 with respect to the heating pipe L31. Specifically, the first pump 7 is disposed upstream of a branch portion (corresponding to the first switching valve V3, described below, in FIG. 2) in the milk flow path L3, at which the bypass pipe L34 branches off, and is provided at a predetermined portion of the milk flow path L3 in the cooling storage 4. In the present embodiment, the first pump 7 corresponds to "beverage conveying pump" of the present invention.

The second pump 8 is a pump for taking in and discharging water from the water tank 5, and is disposed on a water flow path L5. The second pump 8 is a pump for supplying water for filling the milk flow path L3 during the standby mode of the beverage supply apparatus 100, and water (rinse water) for rinsing and cleaning the inside of the milk flow path L3 after milk or a mixed beverage is supplied. One end of the water flow path L5 is connected to an outlet 5a disposed at the bottom of the water tank 5, and the other end is connected to a predetermined portion located between the first pump 7 and the strainer 11 in the milk flow path L3 (hereinafter, referred to as "connection portion Z1"). In the present embodiment, there is provided a bypass pipe L51, which branches off from the water flow path L5 at a predetermined portion downstream (the connection portion Z1 side) of the second pump 8 (hereinafter, referred to as "connection portion Z2"). One end of the bypass pipe L51 is connected to the connection portion Z2, and the other end is connected to a predetermined portion (hereinafter, referred to as "connection portion Z3") in the milk flow path L3 located between the first pump 7 and a branch portion (corresponding to the first switching valve V3, described below, in FIG. 2) at which the inflow pipe L30 and the bypass pipe L34 branch. When the inside of the milk flow path L3, including the portion of the milk flow path L3 accommodated in the cooling storage 4 (internal piping), is subjected to rinsing, the water is supplied to the milk flow path L3 through the connection portion Z1. When the portion of the milk flow path L3 extending outside the cooling storage 4 (external piping) is subjected to rinsing, the water is supplied to the milk flow path L3 via the bypass pipe L51 and the connection portion Z3. In the present embodiment, the water flow path L5 is provided with a return pipe L52 to bypass the second pump 8. One end of the return pipe L52 is connected to a predetermined portion located between the connection portion Z2 and the second pump 8 (hereinafter, referred to as "connection portion Z4"), and the other end is connected to a predetermined portion located between the second pump 8 and the outlet 5a of the water tank 5 (hereinafter, referred to as "connection portion Z5").

The third pump 9 is disposed in an air flow path L6. The third pump 9 is a pump for taking in and discharging air, and is configured to be capable of changing the discharge flow rate of air based on a predetermined input signal. Specifically, the third pump 9 is configured so that its capacity (discharge flow rate, etc.) can be varied by changing the number of revolutions of the pump based on an input signal from the control unit 1, for example.

In the present embodiment, the third pump 9 supplies air for mixed beverage production and air for performing air purging in the milk flow path L3, for example. In other words, in the present embodiment, the third pump 9, that is, only a single pump, serves as both a pump for supplying air for producing a mixed beverage and a pump for supplying air for performing the air purging. The beverage supply apparatus 100 drives the third pump 9 (specifically, further opens a fifth on-off valve V7, described below) to supply air to the milk flow path L3, and drives the first pump 7, to produce a mixed beverage of milk and air, and then, discharges and supplies this mixed beverage from the beverage delivery port 10 into the cup C. In the present embodiment, the third pump 9 corresponds to "air supply pump" of the present invention.

Principally, the air flow path L6 is a flow path through which air to be supplied to the milk flow path L3 flows. For example, one end of the air flow path L6 is connected to an air intake 12 that is open to the outside, and the other end is connected to a predetermined portion located between the connection portion Z1 and the connection portion Z2 in the water flow path L5 (hereinafter, referred to as "connection portion Z6"). Air supplied to the water flow path L5 through the connection portion Z6 flows through a flow path extending between the connection portion Z6 and the connection portion Z1 in the water flow path L5, and the air is finally supplied to the milk flow path L3 through the connection portion Z1 located between the first pump 7 and the strainer 11 in the milk flow path L3. Thus, there is provided the air flow path L6 through which air flows to be supplied to the milk flow path L3 through a predetermined portion (connection portion Z1 in the present embodiment) located between the milk tank 3 and the first pump 7 in the milk flow path L3.

Furthermore, in the present embodiment, there is provided a bypass pipe L61, which branches off from the air flow path L6 at a branch portion Z7 downstream of the third pump 9. One end of the bypass pipe L61 is connected to the branch portion Z7, and the other end is connected to the connection portion Z2 in the water flow path L5. The bypass pipe L61 is connected to the milk flow path L3 via the water flow path L5 or the bypass pipe L51. Principally, the air flow path L6 is configured to have air for mixed beverage production flow therethrough, and the bypass pipe L61 is configured to have air for air purging flow therethrough. In other words, the bypass pipe L61 is configured to branch off from the air flow path L6 at the predetermined portion (branch portion Z7 in FIG. 2) located between the fifth on-off valve V7, which will be described below, and the third pump 9, to bypass the fifth on-off valve V7 and a first throttle part 16, described below, and to be connected to the milk flow path L3. In the present embodiment, the bypass pipe L61 corresponds to "bypass flow path" of the present invention.

Furthermore, in the middle of the air flow path L6, there is connected a release path (discharge path) L7 for discharging some of the air flowing through the air flow path L6, to the outside. One end of the release path L7 is connected to a release point Z8, which is a predetermined portion located between the milk flow path-side end (the portion at the connection portion Z6 in FIG. 2) and the third pump 9 in the air flow path L6, and the other end is open to the outside. In the present embodiment, the connection portion Z6 corresponds to "beverage flow path-side end" of the present invention.

Next, devices provided in the milk flow path L3, the water flow path L5, the bypass pipe L51, the return pipe L52, the air flow path L6, the bypass pipe L61, and the release path L7, will be described in detail.

The milk flow path L3 is provided with the strainer 11, the second on-off valve V2, the first pump 7, an expansion part 13, the first switching valve V3, the heating device 6, and the second switching valve V4, in this order, from the milk tank 3 to the beverage delivery port 10. The connection portion Z1 is located between the second on-off valve V2 and the first pump 7, and the connection portion Z3 is located between the expansion part 13 and the first switching valve V3.

The second on-off valve V2 opens and closes the milk flow path L3, and is constituted by, for example, a solenoid valve, which is closed (N.C.) in the initial state (power OFF).

The first switching valve V3 is a valve for selectively switching flow paths of milk, etc., flowing through the milk flow path L3 between a flow path via the heating pipe L31 and a flow path via the bypass pipe L34, and is constituted by, for example, an electromagnetic three-way valve. For example, the first switching valve V3 is operated to provide communication between the connection portion Z3 and the bypass pipe L34 and to block communication between the connection portion Z3 and the heating pipe L31 (specifically, the inflow pipe L30) in the initial state (power OFF), whereas the first switching valve V3 is operated to block communication between the connection portion Z3 and the bypass pipe L34 and to provide communication between the connection portion Z3 and the heating pipe L31 (specifically, the inflow pipe L30) in the energization state (power ON).

The second switching valve V4 is a valve for selectively switching delivery destinations of milk, etc., which flows through the milk flow path L3, between the beverage delivery port 10 (outlet pipe L33) and the drain pipe L4, and is constituted by, for example, an electromagnetic three-way valve. For example, in the initial state (power OFF), the second switching valve V4 is operated to provide communication between the delivery pipe L32 and the drain pipe L4, and to block communication between the delivery pipe L32 and the outlet pipe L33. In the energization state (power ON), the second switching valve V4 is operated to block communication between the delivery pipe L32 and the drain pipe L4 and to provide communication between the delivery pipe L32 and the outlet pipe L33.

The water flow path L5 is provided with a strainer 14, the second pump 8, a first check valve C1, a third on-off valve V5, a second check valve C2, and a third check valve C3, in this order, from the outlet 5a of the water tank 5 to the connection portion Z1. The connection portion Z2 is located at a predetermined portion between the first check valve C1 and the third on-off valve V5. The connection portion Z4 is located between the first check valve C1 and the connection portion Z2. The connection portion Z5 is located between the strainer 14 and the second pump 8. The connection portion Z6 is located between the second check valve C2 and the third check valve C3.

The third on-off valve V5 opens and closes the water flow path L5, and is constituted by, for example, a solenoid valve, which is closed (N.C.) in the initial state (power OFF). Each of the first check valve C1, the second check valve C2, and the third check valve C3 allows flow from the outlet 5a to the connection portion Z1, and blocks flow from the connection portion Z1 to the outlet 5a. The opening pressure of each check valve (C1 to C3) is set so that the check valves open promptly when the second pump 8 is activated.

The bypass pipe L51 is provided with a fourth on-off valve V6 and a fourth check valve C4, in this order, from the connection portion Z2 to the connection portion Z3.

The fourth on-off valve V6 opens and closes the bypass pipe L51, and is constituted by, for example, a solenoid valve, which is closed (N.C.) in the initial state (power OFF).

The fourth check valve C4 allows flow from the connection portion Z2 to the connection portion Z3, and blocks flow from the connection portion Z3 to the connection portion Z2. The set value of the opening pressure of the fourth check valve C4 is the same as the set value of the opening pressure of each check valve (C1 to C3) provided in the water flow path L5.

The return pipe L52 is provided with a fifth check valve C5 that allows flow from the connection portion Z4 to the connection portion Z5, and blocks flow from the connection portion Z5 to the connection portion Z4. The opening pressure of the fifth check valve C5 is set to be higher than the pressure generated during the normal operation of the second pump 8. That is, the set value of the opening pressure of the fifth check valve C5 is higher than the set value of the opening pressure of each check valve (C1 to C4) provided in the water flow path L5 and the bypass pipe L51. The fifth check valve C5 is configured to be capable of being open to circulate water through the return pipe L52 when an abnormality occurs downstream of the second pump 8.

The air flow path L6 is provided with a strainer 15, the third pump 9, the fifth on-off valve V7, the first throttle part 16, and a sixth check valve C6, in this order, from the air intake 12 to the connection portion Z6. The branch portion Z7 is located at a predetermined portion between the third pump 9 and the fifth on-off valve V7, and the release point Z8 is located between the fifth on-off valve V7 and the first throttle part 16. The bypass pipe L61 branching off from the air flow path L6 at the branch portion Z7 is provided with a sixth on-off valve V8 and a seventh check valve C7, in this order, from the branch portion Z7 to the connection portion Z2.

The fifth on-off valve V7 is disposed in a flow path extending between the release point Z8 and the third pump 9 in the air flow path L6, and opens and closes this flow path. The fifth on-off valve V7 is constituted by, for example, a solenoid valve, which is closed (N.C.) in the initial state (power OFF). In the present embodiment, the fifth on-off valve V7 corresponds to "air flow path on-off valve" of the present invention.

The first throttle part 16 is a throttle element disposed in a flow path extending between the connection portion Z6 and the release point Z8 in the air flow path L6. Specifically, the first throttle part 16 is a fixed throttle having a predetermined throttle channel cross-sectional area A1, and is constituted by, for example, an orifice.

The sixth on-off valve V8 is disposed in the bypass pipe L61, and opens and closes the bypass pipe L61. The sixth on-off valve V8 is constituted by, for example, a solenoid valve, which is closed (N.C.) in the initial state (power OFF). In the present embodiment, the sixth on-off valve V8 corresponds to "bypass flow path on-off valve" of the present invention.

The sixth check valve C6 is disposed in a flow path extending between the connection portion Z6 and the first throttle part 16 in the air flow path L6. The sixth check valve C6 allows flow from the first throttle part 16 to the connection portion Z6, and blocks flow from the connection portion Z6 to the first throttle part 16. In the present embodiment, the sixth check valve C6 corresponds to "air flow path check valve" of the present invention.

The seventh check valve C7 allows flow from the branch portion Z7 to the connection portion Z2, and blocks flow from the connection portion Z2 to the branch portion Z7. The set value of the opening pressure of each of the sixth check valve C6 and the seventh check value C7 is the same as the set value of the opening pressure of each check valve (C1 to C4) provided in the water flow path L5 and the bypass pipe L51. The sixth check valve C6 and the seventh check valve C7 open promptly when the third pump 9 is activated.

A second throttle part 17 is disposed in the release path L7. The second throttle part 17 is a throttle element. Specifically, the second throttle part 17 is a fixed throttle having a throttle channel cross-sectional area A2 that is greater than the throttle channel cross-sectional area A1 of the first throttle part 16, and is constituted by, for example, an orifice.

The beverage supply apparatus 100 is configured so that by supplying air to the milk flow path L3 through a predetermined portion located between the first pump 7 and the milk tank 3 in the milk flow path L3, and by driving the first pump 7, cold milk and the air are mixed, and the mixed beverage is delivered and supplied from the beverage delivery port 10. More specifically, the beverage supply apparatus 100 is configured to be capable of producing a mixed beverage by supplying air taken in by the third pump 9 to the milk flow path L3 via the air flow path L6, the connection portion Z6, the water flow path L5 and the connection portion Z1, and then, by appropriately mixing the air with milk in the milk flow path L3, and by having the mixture flow through the milk flow path L3. The third pump 9 changes the discharge flow rate of air discharged from the third pump 9 by changing the pump revolution number N based on an input signal from the control unit 1. The third pump 9 is configured to be capable of adjusting the air flow rate F of air flowing through the air flow path L6 (specifically, the flow path extending between the connection portion Z6 and the release point Z8) by changing the discharge flow rate. Thus, the beverage supply apparatus 100 is capable of adjusting the mixing ratio of milk and air in a mixed beverage, that is, the ratio of air in a mixed beverage, by appropriately adjusting the pump revolution number N of the third pump 9.

Air Ratio in Mixed Beverage and Viscosity of Mixed Beverage

FIGS. 4A to 4D are conceptual views for explaining the state of a mixed beverage supplied by the beverage supply apparatus 100. Each of FIGS. 4A to 4D shows the state of a mixed beverage with the mixing ratio of milk and air in the mixed beverage (ratio of air in mixed beverage) changed. The ratio of air increases in the order of FIG. 4A, FIG. 4B, FIG. 4C, and FIG. 4D.

Figure 4A:
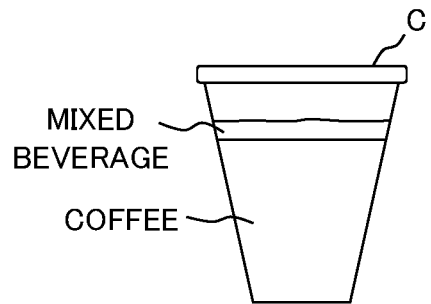
FIGS. 4A to 4D are conceptual views for explaining the state of a mixed beverage supplied by the beverage supply apparatus.
Figure 4B:
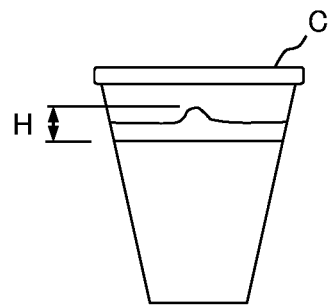
Figure 4C:
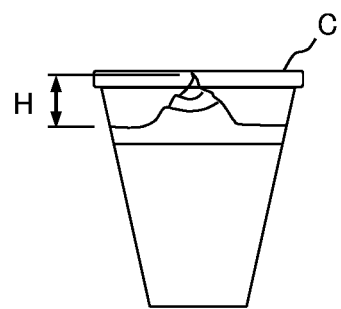
Figure 4D:
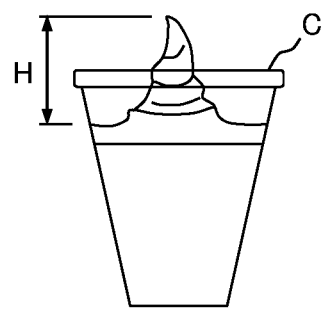

As is shown in FIG. 4A, it should be understood that the mixed beverage spreads substantially flat to cover the surface of coffee in the cup C, and is loose and much less viscous. As is shown in FIG. 4B, it should be understood that the mixed beverage covers the surface of coffee, and the mixed beverage rises a little at the center, and thus, the mixed beverage is viscous. It should be understood that the rising height (peak height) H of the mixed beverage at the center increases from FIG. 4B to FIG. 4D, indicating that the viscosity increases. That is, as the amount of air mixed with milk (air flow rate F) increases to increase the ratio of air in the mixed beverage, the viscosity of the mixed beverage increases. This results in an increase in rising height H of the mixed beverage in appearance. Thus, in order to supply, to the surface of coffee, a mixed beverage having a predetermined rising height H according to the demands and preferences of users, and the like, it is necessary to produce a mixed beverage with predetermined viscosity corresponding to the predetermined rising height H. In order to produce the mixed beverage with the predetermined viscosity, it is necessary to mix air with milk by the ratio corresponding to the predetermined viscosity, with satisfactory reproducibility. That is, as the amount of air (air flow rate F) mixed into the milk increases, the viscosity of the mixed beverage increases so that the rising height H increases, and thus, in order to produce the mixed beverage with the predetermined viscosity (predetermined rising height H), it is necessary to accurately set the amount of air (air flow rate F) to be mixed into the milk.

Relationship Between Pump Revolution Number of Third Pump and Air Flow Rate of Air In the present embodiment, the control unit 1 is configured to perform air purging operation (specifically, a draining process and an air purging process, which will be described below), which makes air flow through the milk flow path L3, and the like. Air for air purging and air for producing a mixed beverage are supplied by the single pump, that is, the third pump 9.

Here, this air purging operation is executed for the purpose of blowing off water, and the like, in the pipes, by driving the third pump 9 and the first pump 7 to make air vigorously flow through the pipes, such as the milk flow path L3. Thus, the amount (flow rate) and discharge pressure of air necessary for this air purging are greater (higher) than the amount (flow rate) and discharge pressure of air necessary for mixed beverage production. Thus, when the air for air purging and the air for mixed beverage production are supplied by the single third pump 9, as in the present embodiment, the third pump 9 is configured to have a maximum discharge flow rate and maximum discharge pressure, which are excessive to perform mixed beverage supply operation (beverage delivery process executed in accordance with the supply instructions S2 or S4, described below). Thus, in the present embodiment, the third pump 9 has a maximum discharge flow rate that exceeds the flow rate range necessary for performing the mixed beverage supply operation, and has an excessive performance for the mixed beverage production. That is, in the present embodiment, the third pump 9, which has the excessive performance for the mixed beverage production, is intentionally employed. As a result, for example, even when the pump revolution number N of the third pump 9 is reduced and the entire amount of air discharged from the third pump 9 is led to the first throttle part 16 during the mixed beverage supply operation, there may be a case in which it is difficult or impossible to set the air flow rate F to a predetermined target air flow rate Fc corresponding to predetermined viscosity (predetermined rising height H) for the reasons described below.

Figure 5:
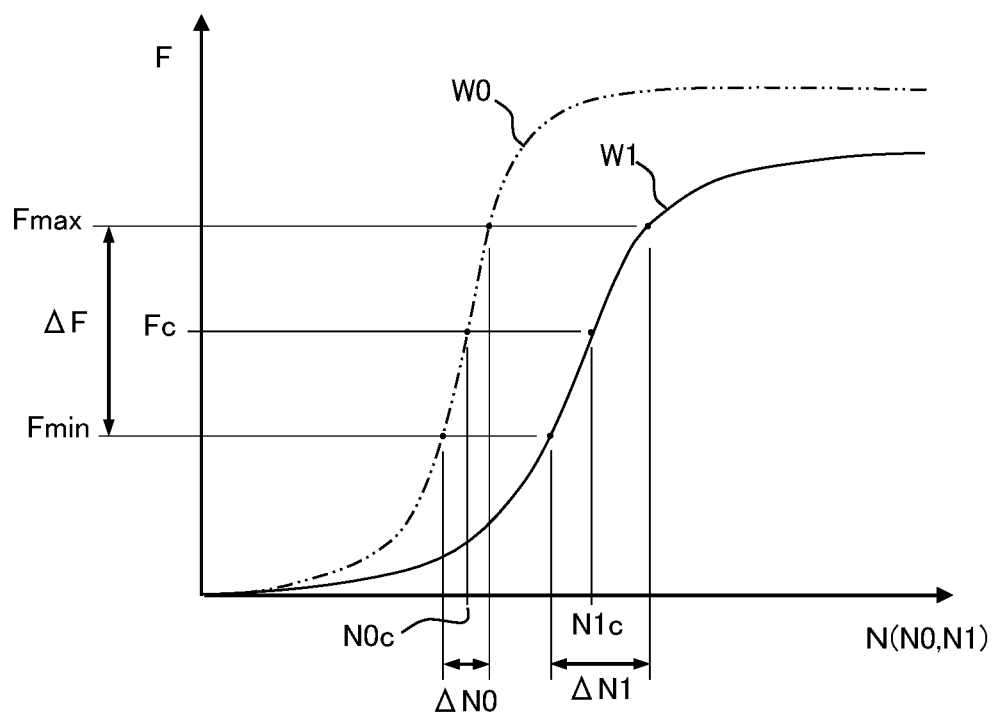
FIG. 5 is a conceptual view for explaining the relationship between the number of revolutions of an air supply pump of the beverage supply apparatus and the air flow rate.

FIG. 5 shows a conceptual view for explaining the relationship between the pump revolution number N (N0, N1) of the third pump 9 employed in the present embodiment, and the air flow rate F of the air flowing through the air flow path L6 downstream of the first throttle part 16. The horizontal axis represents the pump revolution number N (N0, N1) of the third pump 9, and the vertical axis represents the air flow rate F of air corresponding to the pump revolution number N (N0, N1). A curve W0 indicated by a two-dot chain line in the figure shows the relationship between the pump revolution number N0 and the air flow rate F in a case in which the entire amount of air of the discharge flow rate and discharge pressure discharged from the third pump 9 is directly led to the first throttle part 16 (that is, it is assumed there is provided no release path L7). In the figure, a curve W1 indicated by a solid line indicates the relationship between the pump revolution number N1 and the air flow rate F in a case in which some of the air discharged from the third pump 9 is discharged to the outside via the release path L7 (that is, as in the present embodiment in which the release path L7 is provided).

As shown in FIG. 5, the curve W0 (no release path L7 provided) has a steeper gradient of the amount of change of the air flow rate F with respect to the amount of change of the pump revolution number N0 (for example, $\Delta F/\Delta N0$) than the gradient of the amount of change of the air flow rate F with respect to the amount of change of the pump revolution number N1 (for example, $\Delta F/\Delta N1$) in the curve W1 (the present embodiment). That is, the gradient of the curve W0 is steeper than the gradient of the curve W1 in the air flow rate range of the air for mixed beverage production (for example, a range from an upper air flow rate limit Fmax to a lower air flow rate limit Fmin, described below). Thus, since the sensitivity of the change in the control target (air flow rate F) with respect to the change in the pump revolution number N0 is too high in the flow rate range of the air for mixed beverage production, the air flow rate F changes greatly even when the pump revolution number N0 changes slightly. As a result, there may be a case in which it is difficult or impossible to set the air flow rate F to or near the target air flow rate Fc with high accuracy, because the air flow rate F may greatly deviate from the target flow rate Fc when the pump revolution number N slightly deviates from the pump revolution number N0c corresponding to the target air flow rate Fc. A flow rate adjustment range ΔF (upper air flow rate limit Fmax, lower air flow rate limit Fmin) of the air flow rate F corresponding to the viscosity range of the mixed beverage according to the demands and preferences of users, and the like, is estimated in advance. Thus, when the gradient is steep, the adjustment range ΔN0 of the pump revolution number N corresponding to the flow rate adjustment range ΔF might be a relatively narrow range. Thus, it may be difficult or impossible to supply a mixed beverage having viscosity according to the demands and preferences of users, and the like, by adjusting the pump revolution number N0 within this narrow adjustment range ΔN0.

In contrast, according to the present embodiment, since some of the air discharged from the third pump 9 is discharged to the outside through the release path L7, the flow rate of air flowing to the first throttle part 16 decreases compared to a case in which no release path L7 is provided. Specifically, in the present embodiment, the throttle channel cross-sectional area A2 of the second throttle part 17 of the release path L7 is set to be greater than the throttle channel cross-sectional area A1 of the first throttle part 16, so that most of the air discharged from the third pump 9 is discharged to the outside through the second throttle part 17 and the remainder is supplied to the milk flow path L3 through the first throttle part 16. Thus, as shown in FIG. 5, it is possible to make the gradient gentler than when no release path L7 is provided (curve W0), and it is possible to reduce the sensitivity of the change in the air flow rate F with respect to the change in the pump revolution number N1 of the third pump 9 compared with a case in which no release path L7 is provided. Thus, even if the pump revolution number N slightly deviates from the pump revolution number N1c corresponding to the target air flow rate Fc, the air flow rate F is set to be near the target air flow rate Fc. Furthermore, the air flow rate F can be accurately set to the target air flow rate Fc by finely adjusting the pump revolution number N. That is, the air flow rate F of the air supplied to the milk flow path L3 is generally determined based on the discharge flow rate of the third pump 9, the throttle channel cross-sectional area A1 of the first throttle part 16, and the throttle channel cross-sectional area A2 of the second throttle part 17. When changing the viscosity of a mixed beverage, a mixed beverage with predetermined viscosity can be produced with satisfactory reproducibility, merely by adjusting the pump revolution number N based on the input signal from the control part 1 to adjust the discharge flow rate of the third pump 9. Furthermore, according to the present embodiment in which the gradient is gentle, the adjustment range ΔN1 of the pump revolution number N corresponding to the flow rate adjustment range ΔF can be widened, so that the pump revolution number N1 can be adjusted within the wider adjustment range ΔN1. Thus, it is possible to easily and appropriately supply a mixed beverage having viscosity according to demands and preferences of users, and the like.

Specifically, in the present embodiment, the fifth on-off valve V7 is opened and the sixth on-off valve V8 is closed in the mixed beverage supply operation (in a case of a beverage delivery process, described below, executed in accordance with the supply instruction S2 or S4). During the mixed beverage supply operation, the third pump 9 adjusts the pump revolution number N1 based on an input signal from the control unit 1 to adjust the discharge flow rate of the third pump 9, so as to supply a predetermined flow rate (target air flow rate Fc) of air to the milk flow path L3 through the first throttle part 16.

On the other hand, during the air purging operation in which air flows through the milk flow path L3 (i.e., during the draining process and air purging process, described below), the fifth on-off valve V7 is fully closed and the sixth on-off valve V8 is opened. During this air purging operation, the third pump 9 supplies air with a discharge flow rate (large amount) determined based on the input signal from the control unit 1, to the milk flow path L3 via the bypass pipe L61.

In the present embodiment, explanation will be made hereinbelow for a case in which the pump revolution number N1 during the mixed beverage supply operation is set to a predetermined value corresponding to viscosity of the mixed beverage set according to the demands of users of the beverage supply apparatus 100. However, the present invention is not limited thereto. A viscosity selection button for selecting the viscosity of a mixed beverage by a user, or the like, may be provided. The control unit 1 may be configured to control the pump revolution number N1 of the third pump 9 during the mixed beverage supply operation, depending on viscosity selected by a user, and the like.

Operation of Beverage Supply Apparatus

Next, the operation of the beverage supply apparatus 100 according to the present embodiment will be described with reference to the drawings.

The explanation will be given by assuming that, in the initial state, water fills: a predetermined length of piping (for example, the area between the connection portion Z1 and the second switching valve V4 in the milk flow path L3) including at least the heating pipe L31 and the delivery pipe L32 of the milk flow path L3; the water flow path L5; and the drain pipe L4. In the initial state, every on-off valve (V1, V2, V5 to V8) is in the closed state, the first switching valve V3 is in the open state to the bypass pipe L34 side, and the second switching valve V4 is in the open state to the drain pipe L4 side. Accordingly, the control unit 1 executes the initial operation, in which after the water is passed through via the connection portion Z1, the first switching valve V3, the bypass pipe L34, and the drain pipe L4, the first switching valve V3 is activated to make the water pass through via the inflow pipe L30, the heating pipe L31, the delivery pipe L32 and the drain pipe L4; this makes the water fill: the predetermined length of piping (the area between the connection portion Z1 and the second switching valve V4, specifically, between the connection portion Z1 and the first switching valve V3, the inflow pipe L30, the heating pipe L31, the delivery pipe L32 and the bypass pipe L34); the water flow path L5; and the drain pipe L4. In the following, for ease of explanation, the names of the valves (V1 to V8) are omitted, and only the reference symbols (V1 to V8) are indicated in the explanation.

The control unit 1 mainly controls "beverage supply operation" for supplying milk or a mixed beverage in the main body unit 2 and "water filling operation" for filling the milk flow path L3 with water. In the first place, in the initial state, the water fills: the area between the connection portion Z1 and V4 in the milk flow path L3; the water flow path L5; and the drain pipe L4. The control unit 1, based on any of the supply instructions (S1 to S4) from the coffee server 50, controls operation of the main body unit 2 (the cooling storage 4, the heating device 6, the pumps 7 to 9, and the valves V1 to V8) to deliver and supply hot milk, a hot mixed beverage, cold milk, or a cold mixed beverage from the beverage delivery port 10 into the cup C.

Draining Process (Air Purging Process) of Beverage Supply Operation

Specifically, when the control unit 1 receives the supply instruction (S3 or S4) of cold milk or a cold mixed beverage from the coffee server 50, the control unit 1, first, opens V5 and V8, and drives (activates) the first pump 7 and the third pump 9. Thus, a large amount of air discharged from the third pump 9 is supplied to the milk flow path L3 via the branch portion Z7, V8, the connection portion Z2, V5, the connection portion Z6 and the connection portion Z1. Due to this air thus supplied, mainly the water in an area extending from the connection portion Z2 to the connection portion Z1 in the water flow path L5 and the water in the milk flow path L3 are forced out, and are drained as waste water to the outside (a drain tank or a drain port) via the bypass pipe L34 and the drain pipe L4. The draining process (air purging process) with the supply instruction S3 or S4 input is completed in this state.

In contrast, when the control unit 1 receives the supply instruction (S1 or S2) of hot milk or a hot mixed beverage, the control unit 1, in the first place, opens V5 and V8, activates V3 to switch the flow path of the milk flow path L3 to the flow path via the heating pipe L31, and drives the first pump 7 and the third pump 9. Due to the air thus supplied to the milk flow path L3, mainly the water in the area extending from the connection portion Z2 to the connection portion Z1 in the water flow path L5 and the water in the milk flow path L3 are forced out, and are drained as waste water to the outside via the inflow pipe L30, the heating pipe L31, the delivery pipe L32 and the drain pipe L4. The draining process (air purging process) with the supply instruction S1 or S2 input is completed in this state.

Beverage Delivery Process of Beverage Supply Operation

Next, the control unit 1 opens V2 and activates V4 to switch the connection destination of the delivery pipe L32 to the outlet pipe L33, and then drives the first pump 7. Then, the control unit 1 determines whether or not to switch the flow path of the milk flow path L3 to the flow path via the heating pipe L31 and determines whether or not to supply air to the milk flow path L3, according to the input supply instructions (S1 to S4). Furthermore, when the control unit 1 receives the supply instruction (S2 or S4) instructing to supply a mixed beverage, the control unit 1 opens V7, and drives and controls the third pump 9 so that the pump revolution number N1 of the third pump 9 becomes the pump revolution number N1c corresponding to the target air flow rate Fc or falls within a predetermined allowable range.

Specifically, when supplying cold milk (supply instruction S3), the control unit 1 maintains the closing state of V7 without activating V3. Thus, a predetermined amount Q1 of cold milk, which is taken in from the milk tank 3, is delivered by the main body unit 2 from the beverage delivery port 10 into the cup C via the bypass pipe L34, the section of the delivery pipe L32 between the connection portion Z9 and V4, and the outlet pipe L33.

When supplying a cold mixed beverage with predetermined viscosity (supply instruction S4), the control unit 1 opens V7 and drives the third pump 9. In this state, the control unit 1 controls the third pump 9 so that the pump revolution number N1 of the third pump 9 becomes the pump revolution number N1c corresponding to the target air flow rate Fc or falls within a predetermined allowable range. Thus, the main body unit 2 mixes cold milk and air in the milk flow path L3 to produce a predetermined amount Q2 of a cold mixed beverage with predetermined viscosity. The main body unit 2 supplies the resulting cold mixed beverage from the beverage delivery port 10 into the cup C, via the bypass pipe L34, the section of the delivery pipe L32 between the connection portion Z9 and V4, and the outlet pipe L33.

When supplying hot milk (supply instruction S1), the control unit 1 activates V3 to switch the flow path of the milk flow path L3 to the flow path via the heating pipe L31. Therefore, the main body unit 2 drives the first pump 7 to cause cold milk, taken in from the milk tank 3, to flow through the inflow pipe L30, the heating pipe L31 heated by the heating device 6, and the delivery pipe L32, so as to deliver and supply a predetermined amount Q1 of hot milk from the beverage delivery port 10 into the cup C.

When supplying a hot mixed beverage with predetermined viscosity (supply instruction S2), the control unit 1 activates V3 to switch the flow path of the milk flow path L3 to the flow path via the heating pipe L31, opens V7, and drives the third pump 9. In this state, the control unit 1 controls the third pump 9 so that the pump revolution number N1 of the third pump 9 becomes the pump revolution number N1c corresponding to the target air flow rate Fc or falls within a predetermined allowable range. Thus, the main body unit 2 causes the cold mixed beverage produced by mixing the cold milk and the air in the milk flow path L3 to flow through the heating pipe L31, so as to supply the predetermined amount Q2 of hot mixed beverage with the predetermined viscosity from the beverage delivery port 10 into the cup C.

Rinsing Process of Beverage Supply Operation

The control unit 1 is configured to execute a rinsing process of the inside of the milk flow path L3 when the beverage delivery process is completed. Specifically, when the supplying of the predetermined amount of the milk or mixed beverage is completed, the control unit 1 executes a rinsing process by supplying water to the milk flow path L3 through a predetermined portion located between the first pump 7 and the milk tank 3 in the milk flow path L3, and by making the water flow through the milk flow path L3 for a predetermined time period, to rinse the inside of the milk flow path L3, and then, by discharging the rinsing water through the drain pipe L4. Thereafter, the routine of the control unit 1 proceeds to a next water filling process.

Water Filling Operation

When the rinsing process is completed, the control unit 1 controls operation of valves (V1 to V8) and the pumps (7 to 9) to fill, with the water: a predetermined length of piping (for example, the area between the connection portion Z1 and V4 in the milk flow path L3) including at least the heating pipe L31 and the delivery pipe L32 of the milk flow path L3; the water flow path L5; and the drain pipe L4, as in the initial state. Then, the beverage supply apparatus 100 fills, with water, the area between the connection portion Z1 and V4 in the milk flow path L3, the water flow path L5, and the drain pipe L4, and enters the standby mode, as in the initial state.

In the beverage supply apparatus 100 according to the present embodiment, the air flow path L6 is provided with the third pump 9, which is configured to have a discharge flow rate of air changeable based on a predetermined input signal, the fifth on-off valve V7, the release point Z8, and the first throttle part 16, in this order, from the upstream. One end of the release path L7 is connected to the release point Z8. The release path L7 is provided with the second throttle part 17 having the throttle channel cross-sectional area A2 greater than the throttle channel cross-sectional area A1 of the first throttle part 16.

Thus, in the beverage supply apparatus 100, during the mixed beverage supply operation, when the fifth on-off valve V7 is opened and the third pump 9 is driven at a predetermined discharge flow rate, some of the air discharged from the third pump 9 (most of the air in the present embodiment) is discharged to the outside through the release path L7 and the second throttle part 17, and the remainder is supplied to the milk flow path L3 through the first throttle part 16. Thus, in the beverage supply apparatus 100, it is possible to reduce the sensitivity of the change in the air flow rate F with respect to the change in the pump revolution number N by an amount corresponding to the air discharged to the outside, compared with a case in which no release path L7 is provided (i.e., a case indicated by the curve W0 in FIG. 5). Thus, even if the pump revolution number N slightly deviates from the pump revolution number N1c corresponding to the target air flow rate Fc, the air flow rate F is set to be near the target air flow rate Fc. Furthermore, the air flow rate F can be accurately set to the target air flow rate Fc by finely adjusting the pump revolution number N. That is, the air flow rate F of the air supplied to this milk flow path L3 is generally determined based on the discharge flow rate of the third pump 9, the throttle channel cross-sectional area A1 of the first throttle part 16, and the throttle channel cross-sectional area A2 of the second throttle part 17. When changing the viscosity of a mixed beverage, a mixed beverage with predetermined viscosity can be produced with satisfactory reproducibility merely by adjusting the pump revolution number N based on the input signal from the control part 1 to adjust the discharge flow rate of the third pump 9.

In this way, it is possible to provide the beverage supply apparatus 100 capable of producing a mixed beverage with predetermined viscosity with satisfactory reproducibility.

In the beverage supply apparatus 100 according to the present embodiment, the third pump 9 serves both as the pump for supplying air for mixed beverage production and the pump for supplying air for air purging. As described above, during the mixed beverage supply operation, when the fifth on-off valve V7 is opened and the third pump 9 is driven at a predetermined discharge flow rate, some of the air discharged from the third pump 9 (most of the air in the present embodiment) is discharged to the outside through the release path L7 and the second throttle part 17, and the remainder is supplied to the milk flow path L3 through the first throttle part 16.

Thereby, as described above, as shown in FIG. 5, it is possible to make the gradient of the curve W1 gentler than when no release path L7 is provided (curve W0), and it is possible to reduce the sensitivity of the change in the air flow rate F with respect to the change in the pump revolution number N1 of the third pump 9 compared with a case in which no release path L7 is provided. As a result, it is possible to reduce the amount of deviation of the air flow rate F from the target air flow rate Fc due to the performance variation of the third pump 9 (for example, variation in actual pump revolution number), and thus, it is possible to set the air flow rate F to the target air flow rate Fc more accurately. That is, even when the air for mixed beverage production and the air for air purging are supplied by the single pump, that is, the third pump 9, it is possible to produce a mixed beverage with predetermined viscosity with satisfactory reproducibility merely by adjusting the discharge flow rate of the third pump 9 based on the input signal from the control unit 1. Furthermore, since the adjustment range $\Delta N1$ of the pump revolution number N corresponding to the flow rate adjustment range $\Delta F$ can be widened, it is possible to easily and appropriately supply a mixed beverage having viscosity according to the demands and preferences of users, and the like.

In the present embodiment, the beverage supply apparatus 100 further includes: the bypass pipe L61 that bypasses the first throttle part 16 and is connected to the milk flow path L3; and the sixth on-off valve V8 disposed in the bypass pipe L61. During the mixed beverage supply operation, the fifth on-off valve V7 is opened and the sixth on-off valve V8 is closed, and the pump revolution number N1 of the third pump 9 is adjusted based on the input signal from the control unit 1 to adjust the discharge flow rate of the third pump 9 so that the air with the target air flow rate Fc is supplied to the milk flow path L3 through the first throttle part 16. On the other hand, during the air purging operation, the fifth on-off valve V7 is fully closed, the sixth on-off valve V8 is opened, and the third pump 9 supplies the entire amount of air with a discharge flow rate (large amount) determined based on the input signal from the control unit 1, to the milk flow path L3 via the bypass pipe L61. Thus, it is possible to accurately adjust the air flow rate F during the mixed beverage supply operation, and it is possible to effectively use the large amount of air discharged from the third pump 9 via the bypass pipe L61 during the air purging operation. Furthermore, since the air for air purging and the air for mixed beverage production are supplied by the single pump, that is, the third pump 9, it is possible to suppress an increase in cost while suppressing an increase in apparatus size.

In the present embodiment, the throttle channel cross-sectional area A2 of the second throttle part 17 is set to be greater than the throttle channel cross-sectional area A1 of the first throttle part 16. Thus, in a case in which the third pump 9, which has excessive performance for the mixed beverage production, is employed, it is possible to effectively reduce the sensitivity of the change in the air flow rate with respect to the change in the pump revolution number, since most of the air discharged from the third pump 9 is discharged to the outside through the release path L7 and the second throttle part 17.

Furthermore, in the present embodiment, the beverage supply apparatus 100 further includes the sixth check valve C6 disposed in the flow path extending between the connection portion Z6 and the first throttle part 16 in the air flow path L6, the sixth check valve C6 allowing flow from the first throttle part 16 to the connection portion Z6 and blocking flow from the connection portion Z6 to the first throttle part 16. Thus, it is possible to reliably prevent backflow of milk fluid to the air circuit including the air flow path L6, in cooperation with the third check valve C3.

Next, a beverage supply apparatus according to a second embodiment will be explained.

Figure 6:
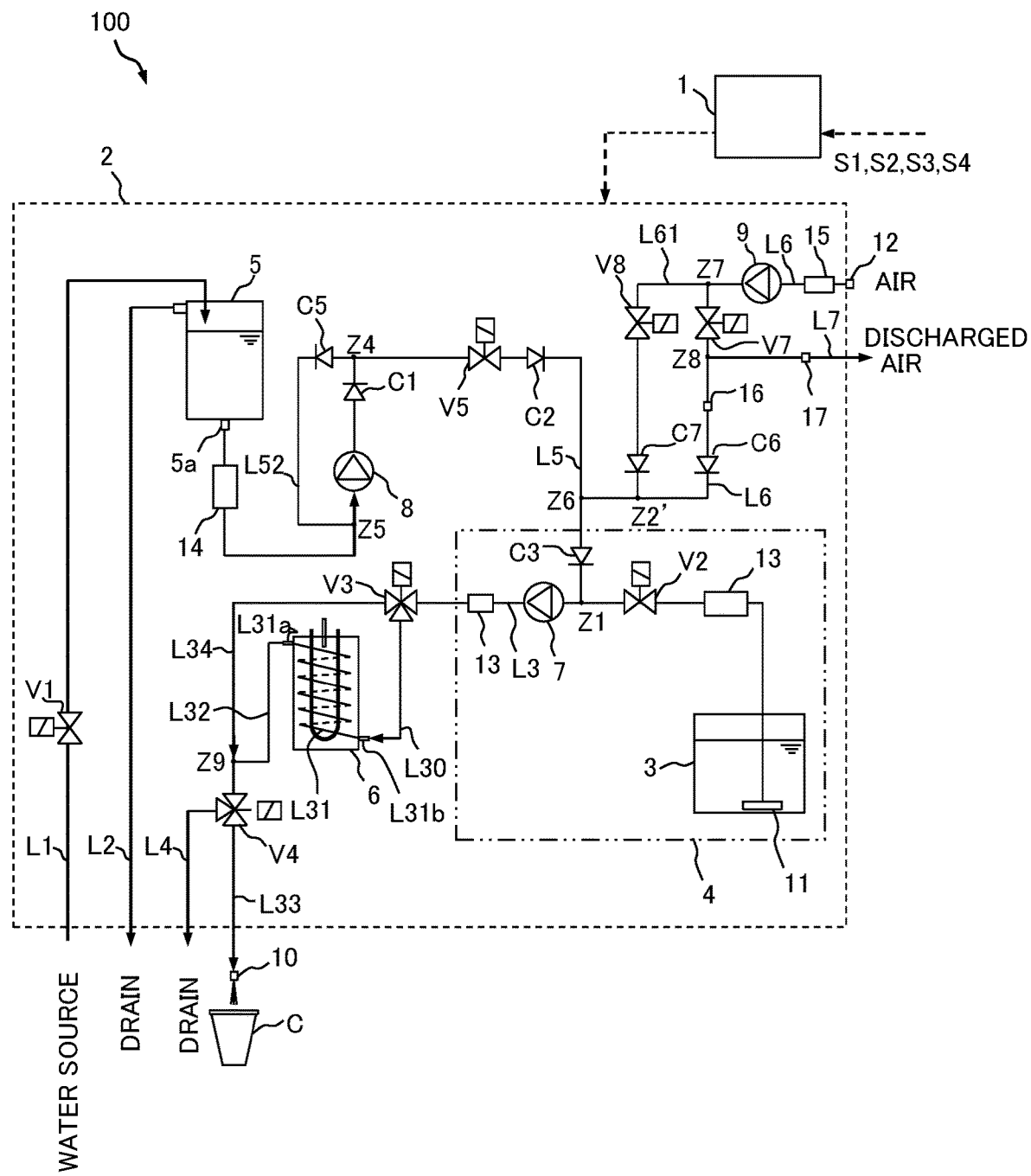
FIG. 6 is a flow line diagram of a beverage supply apparatus according to a second embodiment of the present invention.

FIG. 6 is a block diagram for explaining a schematic configuration of the beverage supply apparatus 100 according to the second embodiment of the present invention. In the following, the same components as in the first embodiment are given the same reference symbols; description thereof is omitted and only differences from the first embodiment will be explained.

The beverage supply apparatus 100 according to the second embodiment differs from that according to the first embodiment in that the bypass pipe L51 of the water flow path L5 is omitted and the connection destination of the other end of the bypass pipe L61 of the air flow path L6 is changed. The other configurations are the same as those in the first embodiment.

One end of the bypass pipe L61 is connected to the branch portion Z7, and the other end is connected to a predetermined portion located between the connection portion Z6 and the sixth check valve C6 in the air flow path L6 (hereinafter, referred to as "connection portion Z2'"). That is, the bypass pipe L61 is configured to branch off from the air flow path L6 at the predetermined portion (branch portion Z7) located between the fifth on-off valve V7 and the third pump 9, to bypass the fifth on-off valve V7 and the first throttle part 16, and to be connected to the milk flow path L3 through the connection portion Z2' and the connection portion Z6.

During the air purging operation, the large amount of air discharged from the third pump 9 is supplied to the milk flow path L3 through the branch portion Z7, V8, the connection portion Z2', the connection portion Z6, and the connection portion Z1. Thus, due to this air thus supplied, mainly the water in an area extending from the connection portion Z6 to the connection portion Z1 in the water flow path L5 and the water in the milk flow path L3 are forced out, and are drained as waste water to the outside (a drain tank or a drain port). Thus, water located upstream of the connection portion Z6 in the water flow path L5 is not drained. Thus, it is possible to reduce the amount of waste water drained to the outside compared with the first embodiment.

Here, for example, in a case in which the supply instruction (S1 or S3) of hot milk or cold milk is input, only the first pump 7 is driven. Thus, there is a possibility that the third check valve C3 and the sixth check valve C6 may be opened due to the flow of milk flowing through the milk flow path L3. Thus, there is a possibility that unnecessary air may be taken in into the milk flow path L3 through the connection portion Z1 via the release path L7, the air flow path L6, and the water flow path L5, according to the supply instruction S1 or S3. In order to reliably prevent this, the following modification shown in FIG. 7 may be applied.

Figure 7:
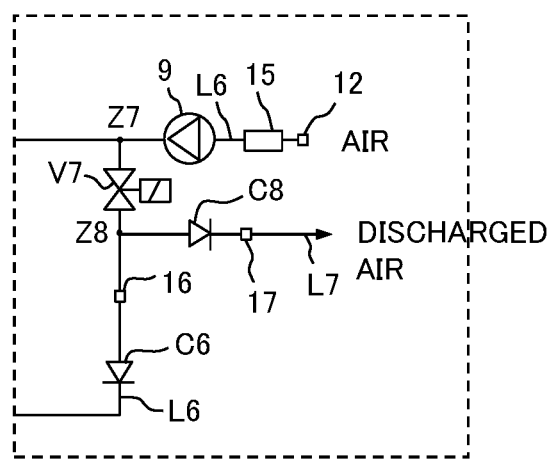
FIG. 7 is a partial flow line diagram for explaining a modified example of the beverage supply apparatus of each embodiment.

FIG. 7 is a flow line diagram for explaining a modification of each embodiment. In the above embodiments, the release path L7 is simply provided with the second throttle part 17; however, the present invention is not limited thereto, and the release path L7 may be further provided with an eighth check valve C8, as shown in FIG. 7. In this modification, the eighth check valve C8 corresponds to "release path check valve" of the present invention.

The eighth check valve C8 allows flow from one end (on the release point Z8 side) to the other end (the outside), and blocks flow from the other end to the one end. In the figure, the eighth check valve C8 is disposed in the flow path extending between the second throttle part 17 and the release point Z8; however, the eighth check valve C8 may be arranged closer to the other end with respect to the second throttle part 17 (i.e., the eighth check valve C8 may be arranged at a position closer to the outside). Thus, it is possible to reliably prevent air intake into the milk flow path L3 during operation that does not require air supply (at the time of the supply instruction S1 or S3).

In the above embodiments, the second throttle part 17 has the throttle channel cross-sectional area A2 set to be greater than the throttle channel cross-sectional area A1 of the first throttle part 16; however, the present invention is not limited thereto. The throttle channel cross-sectional area A2 of the second throttle part 17 may be set to be less than the throttle channel cross-sectional area A1 of the first throttle part 16 or may coincide with the throttle channel cross-sectional area A1 of one throttle part 16, depending on the capability (performance) of the third pump 9. Even in these cases, since at least some of the air discharged from the third pump 9 is discharged to the outside through the release path L7 and the second throttle part 17 during the mixed beverage supply operation, it is possible to reduce the sensitivity of the change in the air flow rate F with respect to the change in the pump revolution number N by an amount corresponding to the air discharged to the outside, compared with a case in which no release path L7 is provided (i.e., a case indicated by the curve W0 in FIG. 5).

In the above embodiments, the pump revolution number N of the third pump 9 is adjusted based on the input signal from the control unit 1 provided in the beverage supply apparatus 100; however, the source from which the input signal is output is not limited thereto. The source of the input signal may be a control unit provided in the coffee server 50, or may be an independent external control device.

In the above embodiments, the air for mixed beverage production is supplied to the milk flow path L3 through the predetermined portion (connection portion Z1) arranged upstream of the first pump 7 in the milk flow path L3, as an exemplary configuration; however, the present invention is not limited thereto. Although not shown in the figure, the bypass pipe L61 may be connected to the downstream side of the first pump 7 (for example, a predetermined portion located between the first pump 7 and the expansion part 13), and may be configured to be capable of supplying air to the milk flow path L3 via the air flow path L6 or the bypass pipe L61 by selectively switching the flow paths of air between the air flow path L6 and the bypass pipe L61, during the mixed beverage supply operation.

In the above embodiments, the case in which the air purging operation is performed has been described as an example; however, if the air purging operation is not required, the bypass pipe L61, the seventh check valve C7, and the sixth on-off valve V8, for example, may be omitted. Here, there may be a case in which it is impossible to select the third pump 9 having appropriate performance, such as discharge pressure and discharge flow rate, appropriate for producing the mixed beverage and a case in which there is no option but to employ the third pump 9 having the excessive performance, despite the unnecessity of the air purging operation. The beverage supply apparatus 100 according to the above embodiments is also preferred in such a case. That is, the beverage supply apparatus 100 is preferred in a case in which there is no option but to employ the third pump 9 having excessive performance or a case in which the third pump 9 having excessive performance is intentionally employed.

In the above embodiments, the beverage supply apparatus 100 is configured to be capable of supplying a hot beverage (milk or a mixed beverage) and a cold beverage (milk or a mixed beverage); however, the present invention is not limited thereto, and the beverage supply apparatus 100 may supply either hot or cold beverages only. Furthermore, in the present embodiment, the beverage supply apparatus 100 is configured to be capable of supplying milk besides a mixed beverage; however, the beverage supply apparatus 100 may be configured to supply a mixed beverage only. Furthermore, when the beverage supply apparatus 100 does not supply any hot beverages, pipes, that is, the inflow pipe L30 extending from V3 to the connection portion Z9, the heating pipe L31, and the delivery pipe L32, and the heating device 6, are unnecessary. When the beverage supply apparatus 100 does not supply any cold beverages, the bypass pipe L34 is unnecessary.

In the above embodiments, the beverage supply apparatus 100 is configured to be capable of selectively supplying milk or a mixed beverage; however, the present invention is not limited thereto. The beverage supply apparatus 100 may supply milk and a mixed beverage consecutively, may supply milk only, or may supply a mixed beverage, in response to one supply instruction. Moreover, not only milk, but also an appropriate liquid beverage may be supplied, and not only mixed beverages of milk and air, but mixed beverages of an appropriate liquid beverage and air may be supplied. Furthermore, the beverage supply apparatus 100 is disposed adjacent to the coffee server 50; however, the present invention is not limited thereto, and the entirety or a part of the beverage supply apparatus 100 may be incorporated in the coffee server 50. Furthermore, the beverage supply apparatus 100 is for use as the optional apparatus of the coffee server 50; however, the present invention is not limited thereto, and the beverage supply apparatus 100 may be used as the optional apparatus of an appropriate beverage supply apparatus or may be used as the apparatus that can independently supply the beverage.

Preferred embodiments and modifications of the present invention have been described; however, the present invention is not limited to these embodiments or modifications, and further modifications and changes can be made based on the technical concept of the present invention.

REFERENCE SYMBOL LIST

3 Milk tank (tank)
7 First pump (beverage conveying pump)
9 Third pump (air supply pump)
10 Beverage delivery port
16 First throttle part
17 Second throttle part
100 Beverage supply apparatus
C6 Sixth check valve (air flow path check valve)
C8 Eighth check valve (release path check valve)
L3 Milk flow path (beverage flow path)
L6 Air flow path
L61 Bypass pipe (bypass flow path)
L7 Release path
V7 Fifth on-off valve (air flow path on-off valve)
V8 Sixth on-off valve (bypass flow path on-off valve)
Z8 Release point

The invention claimed is:

1. A beverage supply apparatus comprising:
a tank for storing a liquid beverage;
a beverage flow path connecting the tank and a beverage delivery port;
a beverage conveying pump disposed in the beverage flow path;
an air flow path through which air to be supplied to the beverage flow path via a predetermined portion located between the tank and the beverage conveying pump in the beverage flow path flows; and
an air supply pump disposed in the air flow path,
wherein the beverage supply apparatus drives the air supply pump to supply air to the beverage flow path and drives the beverage conveying pump, so as to deliver and supply a mixed beverage of the liquid beverage and the air from the beverage delivery port,
the beverage supply apparatus further comprising:
a release path for discharging some of the air flowing through the air flow path to outside, wherein one end of the release path is connected to a release point that is a predetermined portion located between a beverage flow path-side end and the air supply pump in the air flow path, and the other end is open to the outside;
an air flow path on-off valve disposed in a flow path extending between the release point and the air supply pump in the air flow path, wherein the air flow path on-off valve opens and closes the flow path;
a first throttle part disposed in a flow path extending between the beverage flow path-side end and the release point in the air flow path; and
a second throttle part disposed in the release path,
wherein the air supply pump is configured to be capable of changing a discharge flow rate of air based on a predetermined input signal.

2. The beverage supply apparatus according to claim 1, wherein each of the first throttle part and the second throttle part is a fixed throttle having a predetermined throttle channel cross-sectional area.

3. The beverage supply apparatus according to claim 2, wherein the throttle channel cross-sectional area of the second throttle part is greater than the throttle channel cross-sectional area of the first throttle part.

4. The beverage supply apparatus according to claim 1, further comprising a release path check valve disposed in the release path, wherein the release path check valve allows flow from the one end to the other end, and blocks flow from the other end to the one end.

5. The beverage supply apparatus according to claim 1, further comprising an air flow path check valve disposed in a flow path extending between the beverage flow path-side end and the first throttle part in the air flow path, wherein the air flow path check valve allows flow from the first throttle part to the beverage flow path-side end, and blocks flow from the beverage flow path-side end to the first throttle part.

6. The beverage supply apparatus according to claim 1, further comprising:
a bypass flow path is configured to branch off from the air flow path at a predetermined portion located between the air flow path on-off valve and the air supply pump, to bypass the air flow path on-off valve and the first throttle part, and to be connected to the beverage flow path; and
a bypass flow path on-off valve disposed in the bypass flow path,
wherein, during supply operation of the mixed beverage, the air flow path on-off valve is opened, the bypass flow path on-off valve is closed, and the air supply pump adjusts the discharge flow rate based on the predetermined input signal, so as to supply a predetermined flow rate of air to the beverage flow path through the first throttle part,
wherein, during air purging operation in which air flows through the beverage flow path, the air flow path on-off valve is fully closed, the bypass flow path on-off valve is opened, and the air supply pump supplies air having a discharge flow rate determined based on the predetermined input signal, to the beverage flow path via the bypass flow path.

7. The beverage supply apparatus according to claim 1, wherein a liquid milk is stored in the tank as the liquid beverage,
wherein the beverage supply apparatus drives the air supply pump to supply air to the beverage flow path and drives the beverage conveying pump, so as to deliver and supply a mixed beverage of the liquid milk and the air from the beverage delivery port.

* * * * *